United States Patent [19]
Lowe et al.

[11] Patent Number: 5,632,567
[45] Date of Patent: May 27, 1997

[54] MOUNTING FOR AGRICULTURAL TOOLBARS AND TUBES OF DIFFERING CROSS SECTION

[75] Inventors: Terry L. Lowe, Ankeny; James T. Noonan, Johnston, both of Iowa

[73] Assignee: Deere & Company, Moline, Ill.

[21] Appl. No.: 628,045

[22] Filed: Apr. 4, 1996

[51] Int. Cl.$^6$ ........................ F16B 2/02
[52] U.S. Cl. .............. 403/3; 403/256; 403/258; 172/776; 411/531
[58] Field of Search ............... 403/3, 4, 230, 403/247, 256, 258, 261, 241; 411/531, 148, 147; 248/300; 172/148, 311, 776, 681

[56] References Cited

U.S. PATENT DOCUMENTS

| | | | |
|---|---|---|---|
| 2,177,148 | 10/1939 | Newhall | 403/4 |
| 2,980,381 | 4/1961 | Dectrow et al. | 248/223 |
| 4,383,505 | 5/1983 | Hanaoka et al. | 411/531 X |
| 4,539,764 | 9/1985 | Pradier | 403/4 X |
| 4,577,568 | 3/1986 | Netsch | 172/776 X |
| 4,579,179 | 4/1986 | Vachon | 172/776 X |
| 4,729,532 | 3/1988 | Moss | 248/74.1 |
| 5,028,020 | 7/1991 | Sundholm | 248/74.4 |
| 5,359,824 | 11/1994 | Koberstein | 411/148 X |
| 5,387,047 | 2/1995 | Korpi | 403/4 |
| 5,450,910 | 9/1995 | Strzyzewski | 172/681 X |

FOREIGN PATENT DOCUMENTS

| | | | |
|---|---|---|---|
| 213579 | 3/1987 | European Pat. Off. | 172/776 |
| WO95/17610 | 6/1995 | WIPO . | |

Primary Examiner—Harry C. Kim

[57] ABSTRACT

Tube mounted bracket structure for a toolbar or similar tube with a rectangular cross section includes a bracket having a tube abutting flange with an aperture offset from an elongated slot. A rotatable insert has an inwardly directed and elongated projection conforming to the shape of the elongated slot and an aperture located at one extremity of the projection. The aperture extends through the projection and through an integral washer portion which defines an enlarged shoulder area for contacting the tube abutting flange when the insert is positioned in the slot. The elongated projection generally fills the entire slot with the exception of the aperture, thereby presenting a relatively solid bolt receiving area for mounting a U-bolt or similar bolt structure. For a toolbar or tube having relatively large cross section, the insert is positioned in the slot to provide maximum offset from the flange aperture. If the bracket is attached to a toolbar or tube with smaller cross section, the insert is rotated 180 degrees from the position for the first cross section so the projection aperture is positioned to provide minimum offset from the flange aperture.

11 Claims, 2 Drawing Sheets

5,632,567

MOUNTING FOR AGRICULTURAL TOOLBARS AND TUBES OF DIFFERING CROSS SECTION

BACKGROUND OF THE INVENTION

1) Field of the Invention

The present invention relates generally to brackets for use with agricultural toolbars and tool mounting tubes, and, more specifically, to adjustable bracket structure for firmly mounting a rig or other attachment on toolbars or tubes having different cross sections.

2) Related Art

In a variety of agricultural implements, U-bolts or equivalent bolt structures secure a flanged mounting bracket to one face of a toolbar or other mounting tube having a rectangular or square cross section. Depending on the implement and application, the cross section of the tube varies and requires either an adjustable bracket and bolt structure or a completely different mounting structure to accommodate an increase or decrease in the dimension of the face to which the flanged bracket is secured. Adjustable brackets or open slotted brackets can be used with different U-bolts or bolt structure, but such brackets often can be expensive and cumbersome to mount. Some slotted or otherwise adjustable structures provide less than optimum gripping around all sides of the tube, particularly in heavy loading situations that are encountered by the implements. Often the adjustable structures do not positively position the threaded legs of a U-bolt or the other bolt structure. Conical washers or inserts adapted for entry into the mounting holes of the bracket have been provided to increase the grip by the bracket on the sides of the tube, but such inserts do not provide sufficient adjustability to accommodate tubes of differing cross section and can cause excess bending forces and unpredictable clamping forces near the ends of the bolt structure.

BRIEF SUMMARY OF THE INVENTION

It is therefore an object of the present invention to provide an improved tube mounted bracket structure for an agricultural implement. It is a further object to provide such a structure which overcomes most or all of the aforementioned problems.

It is a further object of the invention to provide an improved tube mounted bracket structure for tubes of differing cross section, wherein the bracket structure is simple in construction, has few parts, and is easy to assemble and adjust. It is an additional object to provide such a structure which eliminates need for slotted bolt-receiving structure or conical inserts and which still provides a positive grip on the tube. It is a further object to provide such a structure having a slotted bracket and rotatable slot insert with an integral washer or abutment surface for positively locating the insert and eliminating the need for a separate washer.

It is another object of the invention to provide an improved tube mounted bracket structure which can be attached to tubes of differing cross section. It is still another object to provide such a structure which positively clamps to the tube to prevent any looseness in the resulting connection. It is yet another object to provide such a structure which positively locates the ends of the bolt structure and eliminates problems of excess bending forces and unpredictable clamping forces. It is another object to provide adjustable mounting bracket structure for an implement toolbar or tube which is positively located relative to the tube.

In accordance with the above objects, tube mounted bracket structure for a toolbar or similar mounting tube with a rectangular or square cross section includes a flanged bracket or angle having a tube abutting flange with an aperture offset from an elongated slot. A rotatable insert has an inwardly directed and elongated projection conforming to the shape of the elongated slot and an aperture located at one extremity of the projection. The aperture extends through the projection and through an integral washer portion which defines an enlarged shoulder area for contacting the tube-abutting flange when the insert is positioned in the slot. The elongated projection generally fills the entire slot with the exception of the aperture, thereby presenting a relatively solid bolt receiving area for mounting a U-bolt or similar bolt structure. For a toolbar or tube having a first or relatively large cross section, the insert is positioned in the slot to provide maximum offset of the insert aperture from the flange aperture. The threaded ends of legs of a U-bolt are then inserted through the flange aperture and through the insert aperture, and nuts are threaded onto the U-bolt ends to draw the U-bolt tightly around the faces of the tube. If the bracket is attached to a toolbar or tube with smaller cross section, the insert is rotated 180 degrees from the position for the first cross section so the projection aperture is positioned to provide minimum offset from the flange aperture. A U-bolt or equivalent bolt structure having a shorter connecting portion that assures the threaded legs are located closely adjacent opposite faces of the tube is positioned over the tube with the threaded ends inserted through the flange aperture and the insert aperture. The nuts are then threaded onto the U-bolt ends to provide a secure bracket fit.

The structure is simple and inexpensive in construction, has a minimum number of separate parts, and provides a positive, adjustable aperture location for accommodating at least two different sized tubes. The insert structure assures a tight, secure fit between the bracket and the tube without bending or overstressing the U-bolt. The flange aperture provides a fixed reference location for the bracket structure.

These and other objects, features and advantages of the present invention will become apparent to one skilled in the art upon reading the following detailed description in view of the drawings.

BRIEF DESCRIPTION OF THE DRAWINGS

FIG. 3 is a side view of the insert for the bracket structure of FIGS. 1 and 2.

DETAILED DESCRIPTION OF THE PREFERRED EMBODIMENT

Figure 1:
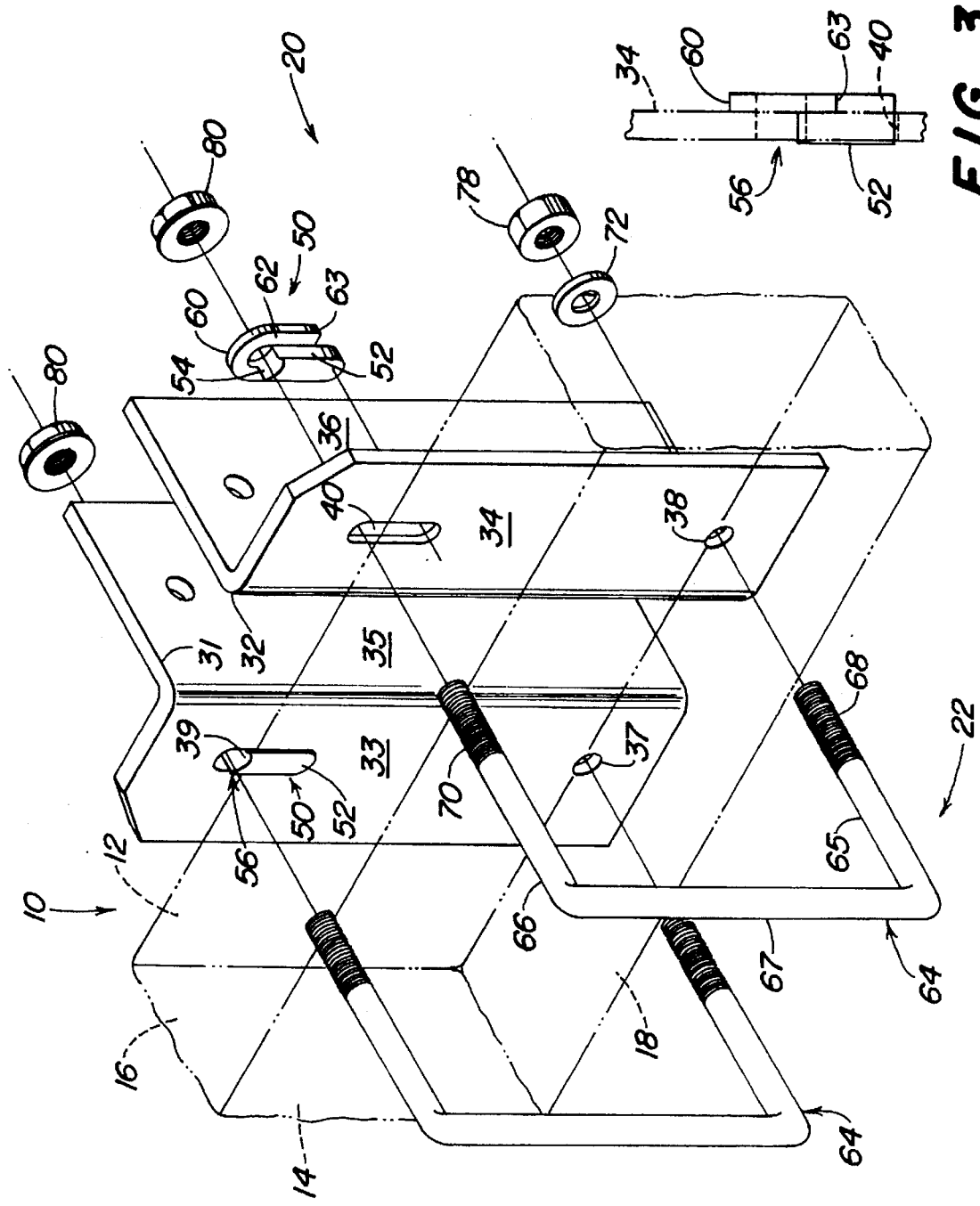
FIG. 1 is an exploded rear perspective view of a portion of a toolbar or tube with the bracket structure constructed in accordance with the teachings of the present invention.

Referring to FIG. 1, therein is shown a toolbar or tube 10 for an agricultural implement such as a cultivator. The tube 10 has a rectangular cross section with opposed faces 12 and 14 and opposite side or top and bottom walls 16 and 18 connecting the faces. Bracket structure 20, mounted on the tube 10 against the face 12 by bolt structure indicated generally at 22, supports additional implement structure (not shown) such as a parallel bar linkage.

As shown in FIG. 1, the bracket structure 20 includes a pair of angles 31 and 32 which are generally mirror images of each other and have tube-abutting faces 33 and 34, respectively, of length substantially greater than the distance between the top and bottom walls 16 and 18. Apertured flanges 35 and 36 extend outwardly from the faces 33 and 34 at a 90 degree angle away from the tube 10. The linkage or other attached structure is sandwiched between and supported by the flanges 35 and 36.

The faces 33 and 34 include lower round apertures 37 and 38 and upper elongated slots 39 and 40. The spacing between the aperture and slot in each of the aperture/slot pairs 37, 39 and 38, 40 approximates the distance between the top and bottom walls 16 and 18 to facilitate reception of the bolt structure 22 and to accommodate the adjustment feature of the present invention, described in detail below.

Figure 2:
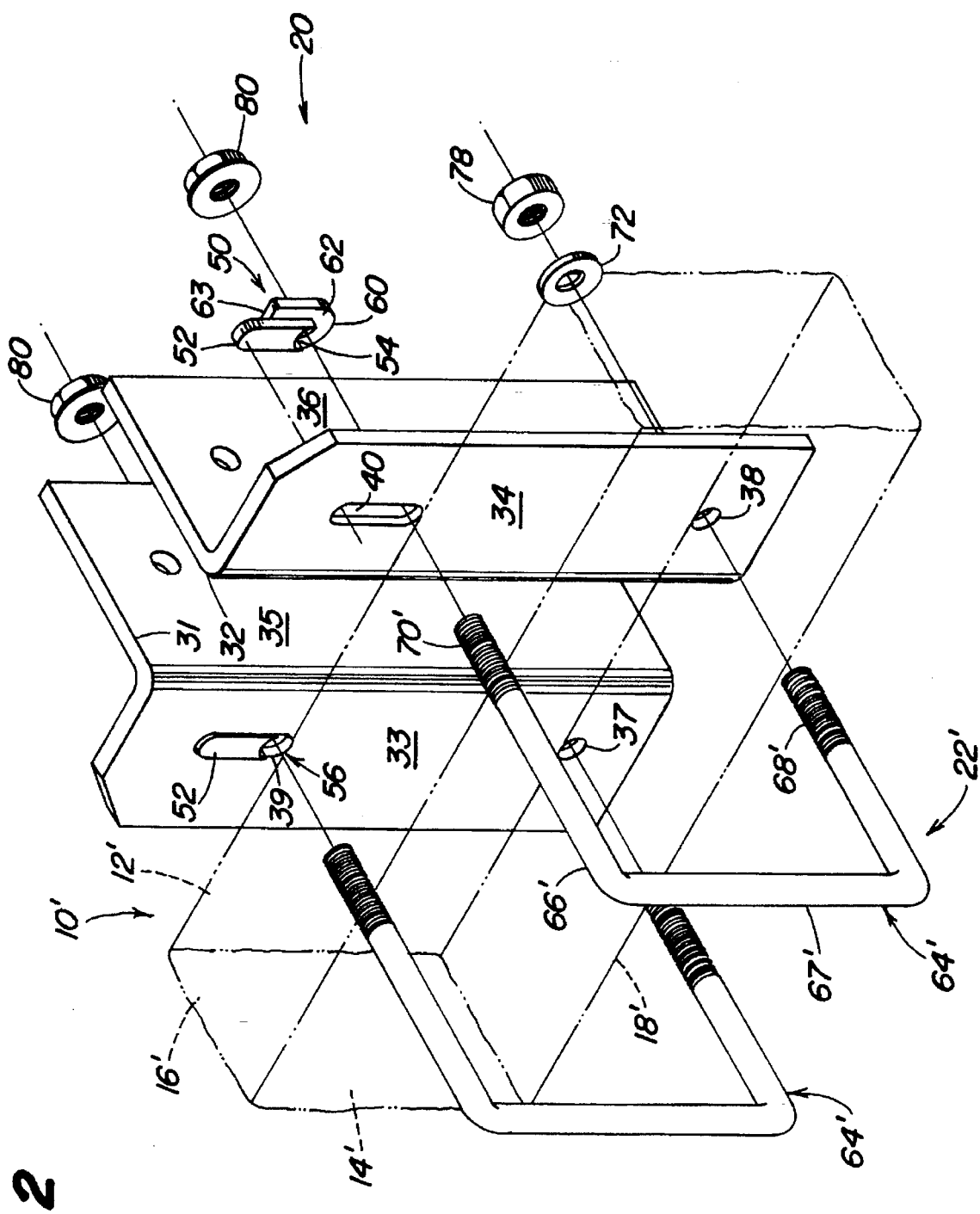
FIG. 2 is a view similar to that of FIG. 1 but showing the bracket structure adjusted for a tube of smaller cross section.

An apertured shim or slot insert 50 is provided for each of the slots 39 and 40. The insert 50 includes a projection 52 conforming to the shape of the slots 39 and 40. One end of the projection 52 is rounded to conform to the rounded ends of the slots, and the opposite end of the projection 52 includes a semi-cylindrical surface 54 which cooperates with the rounded end of the receiving slot to define a generally round bolt-receiving aperture 56. By rotating the insert 50, the bolt-receiving aperture 56 can be positioned either near the upper or distal end of the slot (FIG. 1) for the tube 10 of first cross section or near the lower or proximate end of the slot (FIG. 2) for a tube 10' of cross section smaller than that of the tube 10. Reference to many of the elements in FIG. 2 that may be similar but not identical to those of FIG. 1 are indicated by the same reference number as for FIG. 1 but followed by a prime.

The slot insert 50 includes an integral washer portion 60 defining a generally planar, flange-abutting shoulder 62 along a substantial portion of the projection 52. The washer portion 60 eliminates need for a separate washer for the bolt structure 22. The shoulder 62 assures that the projection 52 is positioned correctly in the slot relative to the opposite faces of the flange 34 (FIG. 3). As can be appreciated from FIGS. 1–3, the washer portion 60 terminates at a location 63 offset from the end of the projection 52 to facilitate fabrication of the insert by a powdered metal forming process. Preferably, the thickness of the projection is slightly greater than that of the area of the flange face 34, and the inner face of the projection is planar and is parallel to the shoulder 62.

The bolt structure 22 includes a pair of identical U-bolts 64 having threaded legs 65 and 66 joined by a central portion 67. Threaded ends 68 and 70 of the legs 65 and 66 are inserted through the aperture 38 and the aperture 56 defined by the slot 40 and the insert 50 positioned in the slot. The length of the central portion 67 of the U-bolt 22 is approximately equal to the distance between the top and bottom walls 16 and 18 of the tube 10 so that the threaded legs 65 and 66 fit snugly around the tube. The insert 50 is positioned so that the aperture 56 is near the top of the slot 40 (FIG. 1) for the larger tube 10. For the smaller tube 10' (FIG. 2) the insert 50 is rotated 180 degrees from the position shown in FIG. 1 so the aperture 56 is near the bottom of the slot 40.

A washer 72 is positioned over the threaded end 68 of the U-bolt 64, and a nut 78 is threaded onto the end 68. A flange nut 80 is threaded onto the end 70. The nuts 78 and 80 are tightened to draw the flange 43 tightly against the face 12. The lower aperture 38 provides a reference location for the angle 32 so that the bracket structure 20 is positively located relative to the tube 10 or 10', that is, positioned at the same location relative to the bottom of tube.

Having described the preferred embodiment, it will become apparent that various modifications can be made without departing from the scope of the invention as defined in the accompanying claims. For example, although the bracket structure is shown with two angles and two U-bolts, a channel member or weldment may also be used with a single U-bolt.

We claim:

1. In an implement including a toolbar having a rectangular cross section with opposed faces and opposite sides, the opposite sides being spaced either a first distance or a second distance apart, the second distance being less than the first distance, adjustable bracket structure adapted for firm mounting against a selected one of the faces regardless of the spacing between the opposite sides being the first or the second distance, the adjustable bracket structure comprising:

a bracket having a flange adapted for positioning against the selected face, the flange including a flange aperture and an elongated slot offset from the flange aperture, the slot having a proximate end nearest the flange aperture and a distal end;

a slot insert including an elongated projection conforming to the elongated slot and having an insert aperture located at an end of the projection;

bracket bolt structure received by the flange aperture and insert aperture for securing the bracket against the face;

wherein the slot insert is positionable within the elongated slot with the insert aperture at either end of the slot, the distance between the insert aperture and the flange aperture being substantially equal to the first distance when the insert aperture is at the distal end and equal to the second distance when the insert aperture is at the proximate end; and wherein the elongated slot has rounded end portions and the protection has a partial cylindrical surface defining with one of the slot end portions a generally round aperture for receiving a portion of the bolt structure.

2. The invention as set forth in claim 1 wherein the slot insert includes an integral washer portion defining a flange-abutting surface for positioning the insert within the slot.

3. The invention as set forth in claim 1 wherein the insert is rotatable between two slot positions, the slot positions being 180 degrees apart.

4. The invention as set forth in claim 1 wherein the bracket bolt structure comprises a U-bolt having legs with threaded ends of radius approximately equal to the radius of the round aperture.

5. In an implement including a toolbar having a rectangular cross section with opposed faces and opposite sides, the opposite sides being spaced either a first distance or a second distance apart, the second distance being less than the first distance, adjustable bracket structure comprising:

an angle member having a flange adapted for positioning against the selected face, the flange including an elongated slot having a proximate slot end and a distal slot end, the slot ends having a rounded configuration of preselected radius;

a slot insert including an elongated projection conforming to the elongated slot and having an integral shoulder area with an insert aperture, the insert aperture offset towards one end of the projection;

bracket bolt structure received by the insert aperture for securing the flange against the selected face;

wherein the slot insert is positionable within the elongated slot with the insert aperture offset toward one end of the slot and is rotatable with respect to the slot so the insert aperture is offset toward the opposite end of the slot to thereby adjust the location of the insert aperture relative to the toolbar to thereby adjust the angle member to the toolbar with the opposite sides being spaced either the first distance or the second distance apart; and wherein the elongated slot has rounded end portions and the protection has a partial cylindrical surface defining with one of the slot end portions a generally round aperture for receiving a portion of the bracket bolt structure.

6. The invention as set forth in claim 5 wherein the flange has inner and outer faces and the shoulder area abuts the outer face and the projection extends through the slot and projects from the inner face.

7. The invention as set forth in claim 5 wherein the shoulder area defines a washer for the bracket bolt structure.

8. The invention as set forth in claim 7 wherein the shoulder area is planar and wherein the projection includes an innermost surface that projects through the slot and has an innermost planar surface parallel to the shoulder area.

9. The invention as set forth in claim 8 wherein the insert is fabricated from powdered metal.

10. In an implement including a toolbar having a rectangular cross section with opposed faces and opposite sides, the opposite sides being spaced either a first distance or a second distance apart, the second distance being less than the first distance, adjustable bracket structure comprising:

an angle member having a flange adapted for positioning against the selected face, the flange including an elongated slot having a proximate slot end and a distal slot end, the slot ends having a rounded configuration of preselected radius;

a slot insert including an elongated projection conforming to the elongated slot and having an integral shoulder area with an insert aperture, the insert aperture offset towards one end of the projection;

bracket bolt structure received by the insert aperture for securing the flange against the selected face;

wherein the slot insert is positionable within the elongated slot with the insert aperture offset toward one end of the slot and is rotatable with respect to the slot so the insert aperture is offset toward the opposite end of the slot to thereby adjust the location of the insert aperture relative to the toolbar to thereby adjust the angle member to the toolbar with the opposite sides being spaced either the first distance or the second distance apart; and wherein the shoulder area defines a washer for the bracket bolt structure; and wherein the projection has a partial cylindrical surface defining with one of the slot end portions a generally round aperture for receiving a portion of the bracket bolt structure.

11. The invention as set forth in claim 10 wherein the bracket bolt structure comprises a U-bolt having a first threaded end received by the round aperture and wherein the flange includes a flange aperture offset from the slot and receiving a second threaded end of the U-bolt.

* * * * *